United States Patent
High et al.

(10) Patent No.: US 10,305,576 B2
(45) Date of Patent: May 28, 2019

(54) PROVIDING WIRELESS INTERNET ACCESS USING AUTONOMOUS VEHICLES

(71) Applicant: Walmart Apollo, LLC, Bentonville, AR (US)

(72) Inventors: Donald R. High, Noel, MO (US); Michael D. Atchley, Springdale, AR (US); John J. O'Brien, Farmington, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/486,015

(22) Filed: Apr. 12, 2017

(65) Prior Publication Data

US 2017/0302362 A1    Oct. 19, 2017

Related U.S. Application Data

(60) Provisional application No. 62/322,023, filed on Apr. 13, 2016.

(51) Int. Cl.
*H04W 4/00* (2018.01)
*H04B 7/185* (2006.01)
(Continued)

(52) U.S. Cl.
CPC ....... *H04B 7/18502* (2013.01); *H04L 67/306* (2013.01); *H04W 4/02* (2013.01);
(Continued)

(58) Field of Classification Search
CPC ..... H04B 7/185; H04B 7/18502; H04L 29/08; H04L 67/306; H04W 4/02; H04W 24/08;
(Continued)

(56) References Cited

U.S. PATENT DOCUMENTS 7,778,873 B2    8/2010    Crolley
7,925,549 B2    4/2011    Looney
(Continued)

FOREIGN PATENT DOCUMENTS

WO    2016042284    3/2016

OTHER PUBLICATIONS

Badman, Lee; "Social WiFi Sign-In: Benefits With a Dark Side"; http://www.networkcomputing.com/wireless-infrastructure/social-wifi-sign-in-benefits-with-a-dark-side/a/d-id/1251043; May 7, 2014; 13 pages.

(Continued)

*Primary Examiner* — Frank Duong
(74) *Attorney, Agent, or Firm* — Fitch, Even, Tabin & Flannery LLP (57) ABSTRACT

Autonomous vehicles such as UAVs or cars provide network access points. User devices connect to the network access points and network access is monitored. User location data is also monitored. A profile of the user is generated from the gathered data. Advertisements are selected based on a profile of the user and the current location of the user. The autonomous vehicles may be distributed geographically to provide a network access to a geographic area. In response to detecting that a user device is moving out of a coverage area of an autonomous vehicle, nearby autonomous vehicles are identified. If the user device is in the coverage area of a nearby autonomous vehicle, the network connection to the user device is transferred to that vehicle.

20 Claims, 5 Drawing Sheets (51) Int. Cl.
  *H04W 4/02*   (2018.01)
  *H04L 29/08*  (2006.01)
  *H04W 24/02*  (2009.01)
  *H04W 4/029*  (2018.01)
  *H04W 48/16*  (2009.01)
  *H04W 84/00*  (2009.01)
  *H04W 84/12*  (2009.01)

(52) U.S. Cl.
  CPC ........... *H04W 4/029* (2018.02); *H04W 24/02* (2013.01); *H04W 48/16* (2013.01); *H04W 84/005* (2013.01); *H04W 84/12* (2013.01)

(58) Field of Classification Search
  CPC ..... H04W 36/04; H04W 36/06; H04W 36/08; H04W 36/10; H04W 36/12; H04W 36/14; H04W 36/18; H04W 36/22; H04W 48/16; H04W 48/20; H04W 84/005; H04W 84/12; H04W 88/08
  See application file for complete search history.

(56) References Cited

U.S. PATENT DOCUMENTS

| | | | |
|---|---|---|---|
| 8,965,460 B1 | 2/2015 | Rao | |
| 9,135,352 B2 | 9/2015 | Kanakarajan | |
| 9,853,715 B2* | 12/2017 | Jalali | H04B 7/18504 |
| 2003/0125029 A1 | 7/2003 | Han | |
| 2009/0239549 A1 | 9/2009 | Grigsby | |
| 2010/0329205 A1 | 12/2010 | Bi | |
| 2012/0047022 A1 | 2/2012 | Shamim | |
| 2012/0235863 A1* | 9/2012 | Erdos | H01Q 3/00 342/359 |
| 2013/0041761 A1* | 2/2013 | Voda | G06Q 30/0259 705/14.68 |
| 2013/0073388 A1 | 3/2013 | Heath | |
| 2013/0079036 A1 | 3/2013 | Sharet | |
| 2015/0006005 A1 | 1/2015 | Yu | |
| 2015/0142552 A1 | 5/2015 | Schmehl | |
| 2015/0227969 A1 | 8/2015 | Hanly | |
| 2015/0236778 A1* | 8/2015 | Jalali | H04W 84/06 370/316 |
| 2015/0266577 A1* | 9/2015 | Jones | G05D 1/102 701/3 |
| 2017/0302627 A1* | 10/2017 | Lai | G06Q 50/01 |

OTHER PUBLICATIONS

Business Wire; "Icomera Launches Innovative Wi-Fi Connectivity Solution to Improve Public Safety Outcomes for Law Enforcement Officers and Citizens"; https://www.yahoo.com/tech/s/icomera-launches-innovative-wi-fi-150000867.html?nf=1; Mar. 10, 2015; 3 pages.

Mobipromo Systems; "MobiPromo Advanced WiFi Marketing System"; https://www.youtube.com/watch?v=XLlojWcd2fQ; Published on Oct. 30, 2013; 8 pages.

Mobipromo Technologies; "WiFi Marketing and Monetization"; https://web.archive.org/web/20151029233011/http://mobipromosystem.com/mobipromo-system; Oct. 29, 2015; 3 pages.

PCT; App. No. PCT/US2017/026912; International Search Report and Written Opinion dated Jun. 30, 2017.

Wifi Adexchange; "How Does Wifi Advertising Work?"; http://wifiadexchange.com/how-does-wifi-advertising-work/; Oct. 29, 2015; 5 pages.

* cited by examiner

PROVIDING WIRELESS INTERNET ACCESS USING AUTONOMOUS VEHICLES

This application claims the benefit of U.S. Provisional Application No. 62/322,023, filed Apr. 13, 2016, entitled PROVIDING WIRELESS INTERNET ACCESS USING AUTONOMOUS VEHICLES, which is incorporated by reference in its entirety herein.

FIELD OF THE INVENTION

This invention relates to systems and methods for providing wireless Internet access points.

BACKGROUND OF THE INVENTION

Smartphones and tablet computers are ever more prevalent. Many computing tasks are performed on mobile devices. However, many computing tasks are Internet-based. Accordingly, a mobile device must have a cellular data connection in order to perform many such tasks. Some mobile devices, such as many tablet computers, lack a cellular data connection. A cellular data plan may also place limits on the amount of data sent and received and the cost for increasing this amount may be very high.

The systems and methods described herein provide an improved approach for providing Internet connectivity to mobile devices.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
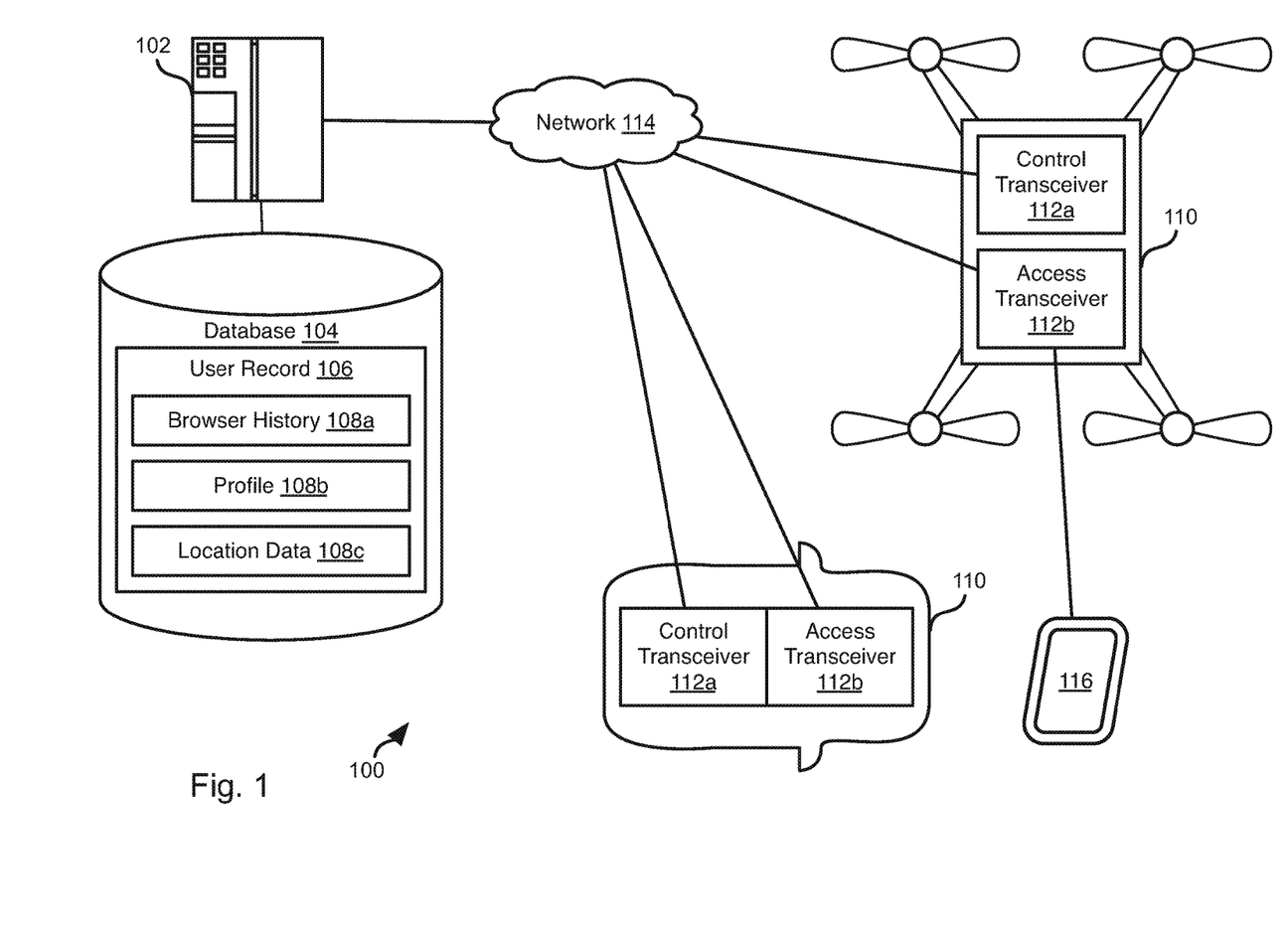
FIG. 1 is a schematic block diagram of a network environment suitable for implementing embodiments of the invention.

Referring to FIG. 1, a network environment 100 may be used to implement methods as described herein. The environment 100 may include a server system 102 operated by a retailer. The server system 102 may host or access a database 104 including a plurality of user records 106. Each user record 106 may correspond to a user that has one or both of used a mobile application provided by the retailer or accessed a wireless network connection provided according to the systems and methods disclosed herein.

The user record 106 of a user may include a browser history 108a. The browser history 108a may store a listing and date of access of web sites, a record of data input to websites (e.g. fillable form elements), and other information relating to a user's activity conducted through a browser or other network-connected application.

The user record 106 may further include a profile 108b. The profile 108b may store attributes of the user that are either provided explicitly by the user or inferred from the user's purchasing activity, browsing activity, or other data obtained from the user. Data inferred may include income, age, gender, interests (sports, hobbies, etc.), and the like. The manner in which attributes and interests of a user are inferred may be performed according to any method known in the art for characterizing consumers based on online activity, such as those described in U.S. application Ser. No. 13/601,604, entitled DETERMINING GIFTABILITY OF A PRODUCT, filed Aug. 31, 2012, which is hereby incorporated herein by reference in its entirety.

The user record 106 may further include location data 108c. A retailer may offer an application executing on a mobile device of the user and that reports locations where the application is accessed, i.e. by using reporting a GPS location of the mobile device when the application is executing thereon. Accordingly, these locations along with the date and time the locations were reported may be stored as location data 108c. A location of a user device may also be inferred based on a location of an autonomous vehicle to which the user device has established a network connection. Accordingly, this inferred location with a time at which the connection existed may be stored in the location data 108c.

As described in greater detail herein, autonomous vehicles 110 may provide wireless network connections to mobile devices in their vicinity. Accordingly, an autonomous vehicle 110 may be provided with one or more transceivers 112a, 112b that are capable of sending and receiving data. In some embodiments, a control transceiver 112a receives instructions controlling the movement of the autonomous vehicle 110 and transmits signals regarding the status and location of the autonomous vehicle 110. An access transceiver 112b transfers data between a network 114 and a mobile device 116 having a wireless connection to the transceiver 112b. The mobile device 116 may be embodied as a smart phone, tablet computer, laptop computer, wearable computing device, or any other type of computing device.

The autonomous vehicles 110 may include unmanned aerial vehicles (UAVs), such as quad copter drones or other types of drones. The autonomous vehicles 110 may include cars, trucks, or other rolling vehicle. Although autonomous vehicles 110 are described throughout this application, a transceiver 112b may also be housed within a non-autonomous vehicle, such as trucks delivering products to retail locations or other vehicles dedicated to providing roaming Internet access.

The network 114 may include any wired or wireless connections and may include some or all of a local area network (LAN), wide area network (WAN), the Internet, or other type of network. The server system 102 may also be coupled to the network 102. In some embodiments, network traffic to and from the transceivers 112b of the autonomous vehicles 110 may be routed through the server 102, such that analysis of the traffic may be performed. Accordingly, the server 102 may be connected to the Internet through the network 114 or some other network.

Figure 2:
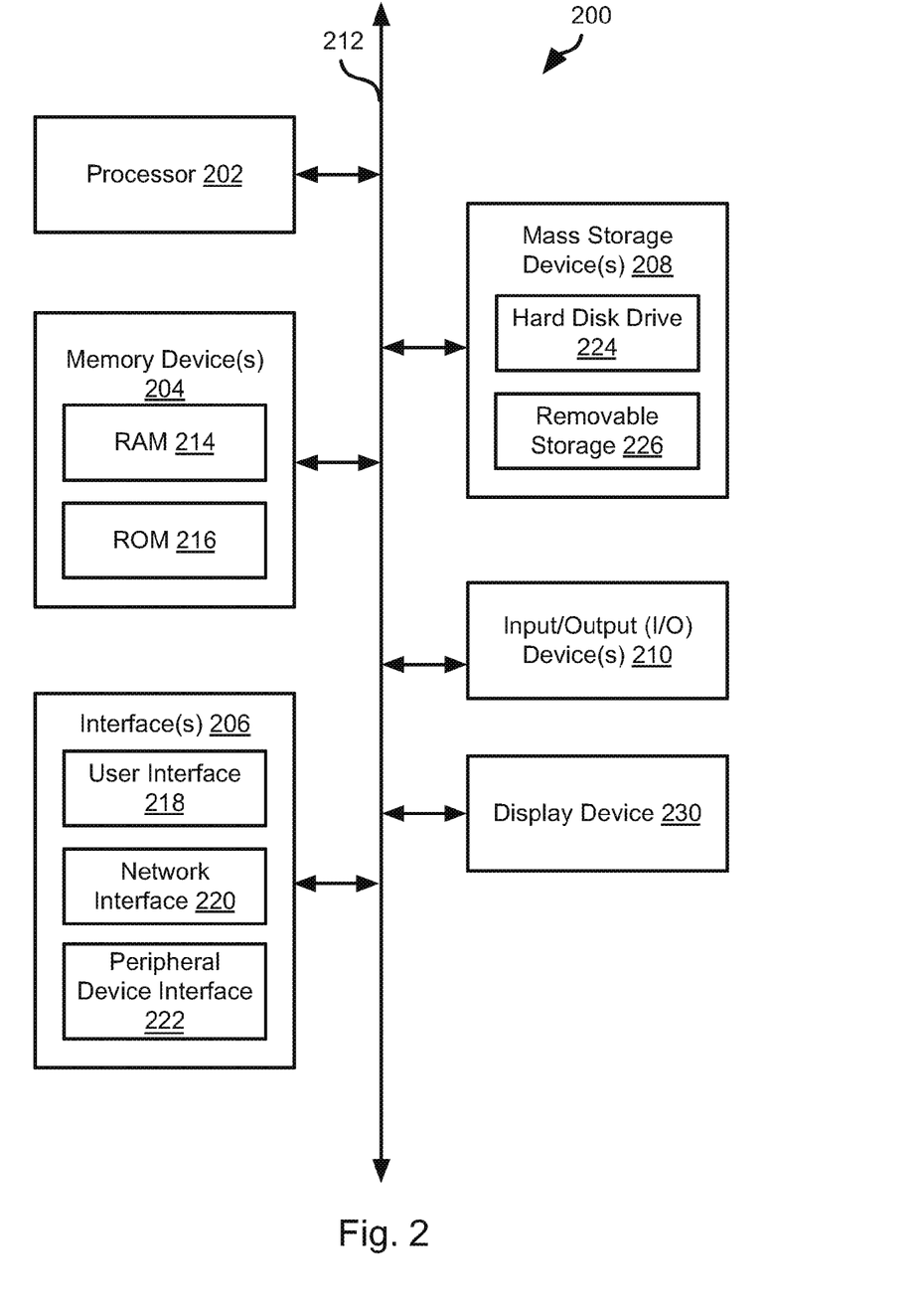
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The server system 102, transceivers 112a, 112b, and user computing device 116 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, a tablet computer and the like. A server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
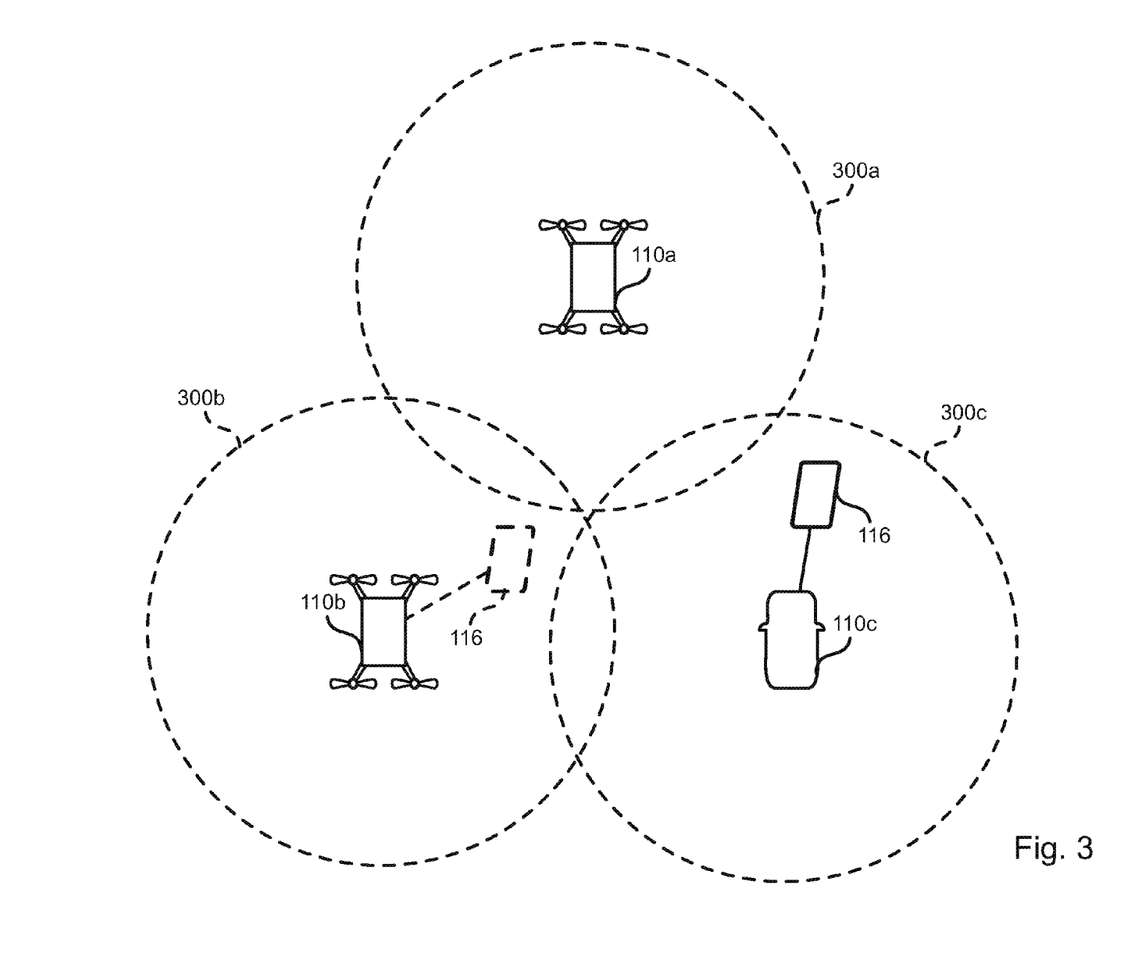
FIG. 3 is a diagram illustrating the availability of network connectivity provided by autonomous vehicles in accordance with an embodiment of the invention.

Turning now to FIG. 3, a plurality of autonomous vehicles 110a-110c may be distributed geographically. The vehicles 110a-110c may be programmed or instructed by the server system 102 to follow a predefined or dynamically-determined path such that the combination of vehicles 110a-110c provides network connectivity to a substantial portion of a geographic area, preferably at least 50 percent, and more preferably at least 90 percent of a geographic area that encompasses all of the vehicles 110a-110c.

For example, as shown, each autonomous vehicle 110a-110c may provide network connectivity within a region 300a-300c surrounding it. As described in detail below, a mobile device 116 may establish a network connection to autonomous vehicle 110c while within its coverage area 300c. Subsequently, this network connection is transferred to another autonomous vehicle 110b in response to movement of the mobile device 116 out of coverage area 300c into coverage area 300b as shown by the dotted representation of the device 116.

The coverage area 300a-300c covered by the autonomous vehicles 110a-110c may be augmented by other network access points, such as manned vehicles including transceivers 112b, fixed network access points mounted to buildings or other structures, and the like. For example, network access points may be housed in retail locations, vending machines, residences, or other locations. The network access points in addition to the autonomous vehicles 110a-110b may include network access points offered by a third party other than the retailer operating the autonomous vehicles.

The network access points providing coverage to an area may operate as stand-alone Wi-Fi hubs and/or routers that allow any computer with a Wi-Fi network adapter to communicate with any other computer connected to the Internet. A plurality of network access points may interact to form an ad hoc peer-to-peer network. Other network access points may provide Wi-Fi connections to other computers and also provide a wired connection to a wired network.

Figure 4:
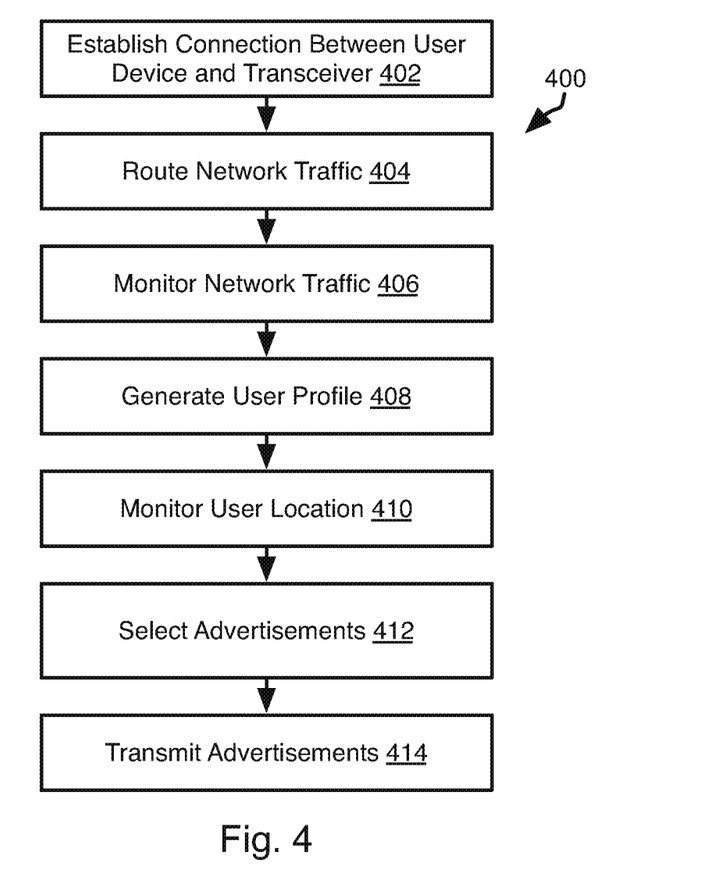
FIG. 4 is a process flow diagram of a method providing Internet connectivity using autonomous vehicles in accordance with an embodiment of the present invention.

Referring to FIG. 4, the illustrated method 400 may be executed by a transceiver 112b in combination with a server system 102. The method 400 may include establishing 402 a network connection between the transceiver 112b of a first autonomous vehicle 110a and a user device 116. The network connection maybe a Wi-Fi connection or a wireless connection according to any wireless data connection protocol known in the art.

The method 400 may further include routing network traffic 404 over the network connection. This may include transmitting requests for web pages or other content from the user device 116 by way of the transceiver 112b to the server system 102. The server system 102 may then retrieve the requested web page or other content and return it to the user device 116 by way of the transceiver 112b to which the user device 116 is connected.

The method 400 may further include monitoring 406 network traffic. In particular, monitoring 406 may include determining webpages visited, information supplied by the user to forms in webpages, video content retrieved, documents retrieved, and other information regarding the user's browsing activity. The data obtained from a user may further include browser data such as cookies, browser history, website information, and profile information purged from other profiles created on other websites. While a connection to a transceiver 112b exists, a proxy of the user device 116 may be stored in the user record 106 of the user as well. Monitoring 406 may be performed by the transceiver 112b or by the server system 102 through which network traffic is routed 404.

The method 400 may further include generating 408 a profile of a user based on the monitored network traffic. Generating 408 the profile may be performed by the server system 102. Additional information provided by the user may also be used to generate 408 a profile, such as transactions conducted by the user with the retailer operating the server system 102 and information supplied by the user when generating a user account.

The profile generated 408 may include information described above as being included in the profile 108b. As noted above, this information may be inferred using any method known in the art, such as those described in application Ser. No. 13/601,604 referenced above.

The method 400 may further include monitoring 410 the location of the user device 116. For example, the user device 116 may include a GPS (Global Positioning System) receiver that determines the location of the user device 116. The user device 116 may then periodically transmit this location to the server system 102 by way of the transceiver 112b to which it is connected. Alternatively, the vehicle 110 in which the transceiver 112b is housed may have a GPS receiver and provide its location to the server system 102. The location of the user device 116 may then be inferred to be within the coverage area of the transceiver 112b about that location. The location data obtained from monitoring 410 may be used as the current location of the user in order to identify offers near the current location. The location data may also be used to determine locations visited, travel trends, and other information used to determine the user's interests.

The method 400 may then include selecting 412 advertisements for the user and transmitting 414 the selected advertisements to the user device 116. In particular the advertisements may be selected 412 and transmitted 414 while the connection between the user device 116 and transceiver 112*b* established at step 402 exists.

Advertisements may be selected 412 from a set of advertisements automatically obtained from various sources. For example, the method 400 may be preceded by collecting information such as offers of competitors for one or more products near the location of the user device 116, scheduled events in the neighborhood where the user device 116 is located (or at another location referenced in the location data 198*c* of the user), analysis of other customer profiles, and the dates of any upcoming large national events. Advertisements may be selected that relate to some or all of this data. For example, offers matching a competitor offer, invitations to local events, and offers for products for celebrating a large national event may be generated and transmitted to a user device 116. The advertisements may be for products offered by the retailer or by a third party, such as a manufacturer, that defines offers and other elements of an advertisement campaign that are available for transmission 114 to a user device 116. In some embodiments, social media data, weather data, or other trending data may be collected to determine products that are currently popular or are likely to popular.

Selecting 412 the advertisements may include selecting advertisements that are targeted to the user based on some or all of the web usage of the user, the profile of the user (including any expressly provided preferences of the user), and the current location of the user device 116, information gathered from the user device 116 itself (such as from user interaction with an application of the retailer installed on the user device 116). In some instances, advertisements may be selected for transmission to a user device 116 based on some or all of the above listed information gathered from another user device 116 coupled to one of the network access points, such as one provided by an autonomous vehicle 110.

For example, advertisements may be selected that reference products related to products searched for by the user or relating to activities or topics referenced by webpages requested by the user. The advertisements selected may include special offers currently in effect at or near the location of the user device 116. The advertisements selected 412 may be selected based on the profile of the user as well, i.e. that relate to the interests, demographic, and/or income of the user.

In another example, an advertisement including a lunch menu or offers for food currently offered for sale at or near the current location of the user device 116 may be selected 412 and transmitted 414.

In another example, where a product is identified as being of interest, a location of a retail location at which the product is available may be transmitted at step 414. Alternatively, an advertisement selected 412 may include a location of a retail location nearest the location of the user device 116 and a description of the services and selection offered at that retail location. The advertisements selected may relate to offers at a physical retail location or offers available through an online portal, i.e. an ecommerce web site.

The advertisements selected 412 may include reminders to purchase product previously purchased by the user, reminders for events that will be occurring near the location of the user device 116, and reminders to perform services that were previously used by the user or for products previously purchased by the user. The advertisements selected 412 may include offers to purchase items for holiday layaway and for buying products to be shipped to a store near the location of the user device 116.

Transmitting 414 the advertisements may be performed in a variety of ways. The advertisements may be transmitted 414 as an overlay that is superimposed around a rendering of content requested by the user on the user device 116. Transmitting 414 the advertisements may include transmitting 414 the advertisements for display in a retailer's application executing on the user device 116. In other embodiments, advertisements 414 are transmitted as popup advertisements superimposed over content requested by the user device 116. Advertisements may be transmitted 414 and invoke functions provided by one or more browser extensions executing on the user device 116.

Advertisements may also be displayed on an autonomous vehicle 110 itself or on another vehicle or structure providing a network access point. These advertisements may be selected in the same manner as the advertisements selected for transmission 414 to a user device 116.

Figure 5:
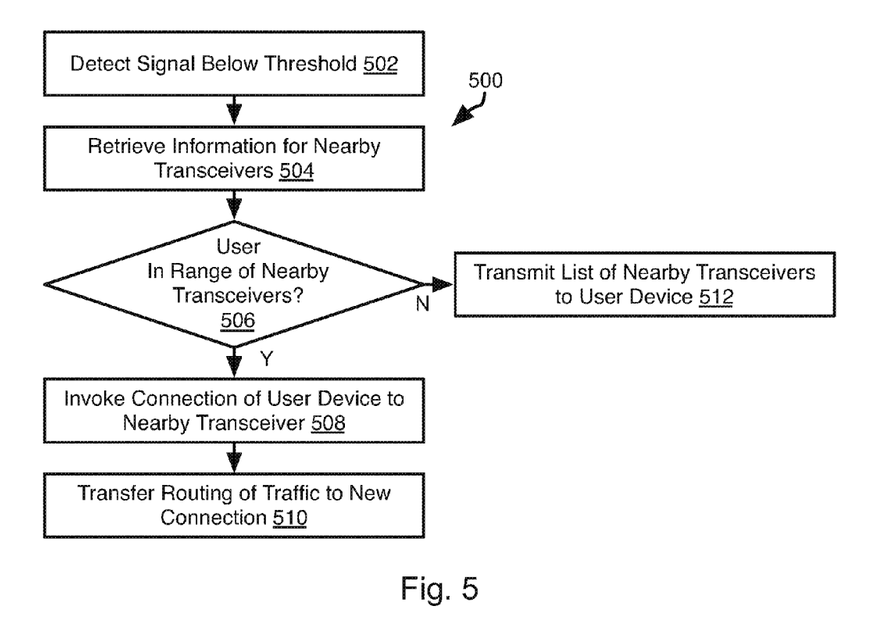
FIG. 5 is a process flow diagram of a method for transferring a network connection in accordance with an embodiment of the present invention.

Referring to FIG. 5, the illustrated method 500 may be used to transfer a network connection from one autonomous vehicle 110 to another autonomous vehicle 110 or other network access point. The transceivers 112*b* of the autonomous vehicles 110 include a controller that facilitates seamless transfer of a network connection between autonomous vehicles 110 in response to movement of a user device out of the coverage area of an autonomous vehicle 110. This controller may be embodied as a UNIFI access point, a MERAKI access point, UBIQUITI NETWORKS access point operating in zero-handoff mode, CISCO AIRONET access point, or the like.

The method 500 may include detecting 502, by the transceiver 112*b* to which a user device 116 is currently connected ("the original transceiver 112*b*"), that a signal from a user device 116 having a wireless connection to the original transceiver 112*b* is below a threshold value. Alternatively, step 502 may include receiving a message from the user device 116 indicating that the signal from the original transceiver 112*b* detected by the user device 116 is below a threshold value.

In response to detecting 502 the signal falling below the threshold value, the method 500 may include retrieving 504 by the original transceiver 112*b*, information for nearby transceivers 112*b*. For example, the user device 116 may report its current location to the original transceiver 112*b*. The original transceiver 112*b* may transmit this location, or the original transceiver's 112*b* own location to the server system 102. The server system 102 may then identify one or more other autonomous vehicles or other access points that are located near the transmitted location, i.e. from reports of the locations of the other autonomous vehicles periodically provided by them to the server system 102.

In another example, retrieving 504 information for nearby transceivers 112*b* may include detecting signals from the nearby transceivers 112*b* or receiving wireless messages from the nearby transceivers 112*b* reporting their location. For example, the function "bgscan" may be executed, as known in the art.

The information received 504 from the server system 102 or from the nearby transceivers 112*b* themselves may include receiving sufficient information to enable a user device 116 to establish a network connection to the nearby transceivers 112*b*, such as a name of the network transceiver, a key or security code for establishing a wireless connection to the transceivers 112*b*, and the like.

The method 500 may further include evaluating 506 whether the user device 116 is within the coverage area of any of the nearby transceivers 112*b*. For example, the location of the user device 116 may be compared to the locations of the nearby transceivers 112b. If the distance between the user device 116 and at least one of the nearby transceivers 112b is less than a threshold distance, then the result of the evaluation 506 is positive.

The method 500 will therefore include invoking 508, by the original transceiver 112b connection of the user device 116 to the nearby transceiver identified at step 506. Where multiple nearby transceivers 112b meet the condition of step 506, step 508 may include invoking connection to the nearby transceiver 112b that is closest to the user device 116 (hereinafter "the selected transceiver 112b"). Invoking 508 connection may include transmitting the information retrieved at step 504 to the user device 116 with an instruction to transfer the network connection to the original transceiver 112b to the selected nearby transceiver 112b. Invoking 508 connection may include transmitting an instruction to the selected transceiver 112b with network information for the user device 116, the instruction instructing the selected transceiver 112b to establish a network connection with the user device 116.

The method 500 may then include transferring 510 the routing of network traffic to and from the user device 116 to the selected transceiver 112b. Transferring 510 may include transferring a state of one or more layers of a protocol stack to the selected transceiver 112b and otherwise enabling the selected transceiver 112b to continue the transfer of network traffic without user-perceptible interruption.

If no nearby transceivers are found 506 to have the user device 116 within the coverage area thereof, then the method 512 may include transmitting 512 as list of the identifiers and/or locations of the nearby transceivers 112b such that the user may move to the coverage of one of these transceivers 112b.

In some embodiments, when a user disconnects from a transceiver 112b, this disconnection will be tracked, e.g. reported to the server system 102. Additionally, when a user moves from one transceiver 112b to another transceiver (e.g. step 510), this action may also be tracked. In this manner, the transceivers 112b to which a user is connected to, or reconnects to, will be known and may be used for analyzing a user's movements and behavior.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for providing internet access comprising:
providing a plurality of autonomous vehicles distributed geographically, each having a wireless transceiver and coupled wirelessly to a wired network;
establishing, by a first autonomous vehicle of the plurality of autonomous vehicle, a first connection to a user device with the transceiver of the first autonomous vehicle;
routing, by the first autonomous vehicle, network traffic between the wired network and the user device over the first connection using the transceiver of the first autonomous vehicle;
detecting, by the first autonomous vehicle through the wireless transceiver of the first autonomous vehicle, weakening of a wireless signal from the user device; and
in response to detecting weakening of the wireless signal:
(a) detecting, by the first autonomous vehicle a second autonomous vehicle of the plurality of autonomous vehicles that is closer to the user device than the first autonomous vehicle;
(b) establishing, by the first autonomous vehicle, a second connection to the user device with the transceiver of the second autonomous vehicle; and
(c) transitioning, by the first autonomous vehicle, routing of the network traffic to the second connection.

2. The method of claim 1, wherein the plurality of autonomous vehicles include a plurality of unmanned aerial vehicle (UAV).

3. The method of claim 1, wherein the plurality of autonomous vehicles include a plurality of road vehicles.

4. The method of claim 1, wherein transitioning routing of the network traffic to the second connection is performed without perceptible interruption of the network traffic on the user device.

5. The method of claim 1, wherein the plurality of autonomous vehicles are distributed over a geographic area such that the transceivers of the plurality of autonomous vehicles provide network access to at least 90 percent of the geographic area.

6. The method of claim 1, further comprising:
detecting, by the second autonomous vehicle through the wireless transceiver of the second autonomous vehicle, loss of a wireless signal from the user device;
determining, by the second autonomous vehicle, that no other autonomous vehicle of the plurality of autonomous vehicles is sufficiently close to the user device to connect to the user device;
in response to determining that no other autonomous vehicle of the plurality of autonomous vehicles is sufficiently close to the user device to connect to the user device, transmitting, by the second autonomous vehicle, a list of locations of one or more autonomous vehicles of the plurality of autonomous vehicle closest to the user device to enable a user of the user device to move within a coverage area of at least one of the one or more autonomous vehicles on the list.

7. The method of claim 1, wherein the first and second connections are WI-FI connections.

8. The method of claim 1, further comprising:
monitoring, by a server system coupled to the transceivers of the first and second autonomous vehicles, the network traffic;
identifying, by the server system, advertisements relating to content in the network traffic; and
transmitting, by the server system, the advertisements to the user device.

9. The method of claim 1, further comprising:
monitoring, by a server system coupled to the transceivers of the first and second autonomous vehicles, a location of the user device;
identifying, by the server system, advertisements relating to the location of the user device; and
transmitting, by the server system, the advertisements to the user device.

10. The method of claim 1, further comprising:
monitoring, by a server system coupled to the transceivers of the first and second autonomous vehicles, the network traffic;
determining, by the server system, from the network traffic one or more preferences of a user associated with the user device;

identifying, by the server system, advertisements relating to the one or more preferences; and transmitting, by the server system, the advertisements to the user device.

11. A system for providing internet access comprising:

a plurality of autonomous vehicles distributed geographically, each having a wireless transceiver coupled wirelessly to a wired network and a controller coupled to each wireless transceiver and programmed to:

establish a first connection to a user device with the transceiver of a corresponding autonomous vehicle of the plurality of autonomous vehicle;

route network traffic between the wired network and the user device over the first connection using the transceiver of the corresponding autonomous vehicle; and if weakening of a wireless signal from the user device is detected
  (a) detect a second autonomous vehicle of the plurality of autonomous vehicles that is closer to the user device than the corresponding autonomous vehicle;
  (b) invoke establishment of a second connection between the user device and the second autonomous vehicle; and
  (c) transition routing of the network traffic to the second connection.

12. The system of claim 11, wherein the plurality of autonomous vehicles include a plurality of unmanned aerial vehicle (UAV).

13. The system of claim 11, wherein the plurality of autonomous vehicles include a plurality of road vehicles.

14. The system of claim 11, wherein the controller is further programmed to transition routing of the network traffic to the second connection without perceptible interruption of the network traffic on the user device.

15. The system of claim 11, wherein the plurality of autonomous vehicles are distributed over a geographic area such that the transceivers of the plurality of autonomous vehicles provide network access to at least 90 percent of the geographic area.

16. The system of claim 11, wherein the controller is further programmed to:

if loss of a wireless signal from the user device is detected and if no other autonomous vehicle of the plurality of autonomous vehicles is sufficiently close to the user device to connect to the user device, transmit a list of locations of one or more autonomous vehicles of the plurality of autonomous vehicle closest to the user device to enable a user of the user device to move within a coverage area of at least one of the one or more autonomous vehicles on the list.

17. The system of claim 11, wherein the first and second connections are WI-FI connections.

18. The system of claim 11, further comprising a server system in data communication with the controllers of the autonomous vehicles, the server system programmed to:

monitor the network traffic;

identify advertisements relating to content in the network traffic; and transmit the advertisements to the user device.

19. The system of claim 11, further comprising a server system in data communication with the controllers of the autonomous vehicles, the server system programmed to:

monitor a location of the user device;

identify advertisements relating to the location of the user device; and transmit the advertisements to the user device.

20. The system of claim 11, further comprising a server system in data communication with the controllers of the autonomous vehicles, the server system programmed to:

monitor the network traffic;

determine from the network traffic one or more preferences of a user associated with the user device;

identify advertisements relating to the one or more preferences; and transmit the advertisements to the user device.

* * * * *